(12) United States Patent
Kelly

(10) Patent No.: US 12,103,634 B2
(45) Date of Patent: Oct. 1, 2024

(54) DEVICE FOR CHANGING THE GEAR OF A BICYCLE

(71) Applicant: Brompton Bicycle Ltd, Greeford (GB)

(72) Inventor: David Kelly, Greenford (GB)

(73) Assignee: BROMPTON BICYCLE, LTD., Greenford (GB)

( * ) Notice: Subject to any disclaimer, the term of this patent is extended or adjusted under 35 U.S.C. 154(b) by 0 days.

(21) Appl. No.: 17/900,719

(22) Filed: Aug. 31, 2022

(65) Prior Publication Data

US 2023/0065756 A1 Mar. 2, 2023

(30) Foreign Application Priority Data

Aug. 31, 2021 (DE) .......................... 202021002811.0

(51) Int. Cl.
B62M 25/04 (2006.01)
(52) U.S. Cl.
CPC .................................. B62M 25/04 (2013.01)
(58) Field of Classification Search
None
See application file for complete search history.

(56) References Cited

U.S. PATENT DOCUMENTS

| | | | | | |
|---|---|---|---|---|---|
| 2,924,115 | A | * | 2/1960 | Hood | B62M 25/04 74/489 |
| 3,693,469 | A | * | 9/1972 | Ozaki | B62M 25/04 74/489 |
| 4,627,305 | A | * | 12/1986 | Hosokawa | B62M 25/04 74/489 |

* cited by examiner

*Primary Examiner* — Vicky A Johnson
(74) *Attorney, Agent, or Firm* — Husch Blackwell

(57) ABSTRACT

This disclosure relates to a device for changing a gear of a bicycle. The device can include a casing, a lever moveable relative to the casing for actuating a gear change of a bicycle, and a rail arranged on the casing, wherein the rail extends between a first end and a second end. The lever can be configured to move along a length direction of the rail, which extends between the first end and the second end of the rail, for actuating the gear change of the bicycle. The rail can extend about a width direction and project from the casing about a height direction. The casing can include a flange located at the second end of the rail, and the flange can be configured for inhibiting the lever to continue moving beyond the second end of the rail in a direction which extends away from both the first end and the second end of the rail. The flange can at least partially span a width of the rail.

20 Claims, 4 Drawing Sheets

DEVICE FOR CHANGING THE GEAR OF A BICYCLE

PRIORITY CLAIM

The present application is a Paris Convention entry into the United States from, and claims the priority benefit of, German Application No. 20 2021 002811.0, filed Aug. 31, 2021, which is hereby fully incorporated herein by reference.

TECHNICAL FIELD

The present disclosure relates to a bicycle component, in particular a device for changing the gear of a bicycle.

BACKGROUND

Cyclists change gears during use of bicycle to enable an editable ride experience. This allows the user to tailor the gear of the bicycle to the terrain on which the user is travelling. It is important for a gear changing system to deliver a change of gear when expected by a user. Bicycles are used in all weather conditions and lighting conditions on busy and quiet roads. It is important for a gear changing system to provide a reliable gear change when operated by a user.

SUMMARY

According to a first aspect of certain embodiments there is provided a device for changing the gear of a bicycle, the device comprising: a casing; and, a lever moveable relative to the casing for actuating a gear change of a bicycle; a rail arranged on the casing: wherein the rail extends between a first end and a second end, wherein the lever is configured to move along a length direction of the rail, which extends between the first end and the second end of the rail, for actuating the gear change of the bicycle, wherein the rail extends about a width direction, and wherein the rail projects from the casing about a height direction; wherein the casing comprises a flange located at the second end of the rail, wherein the flange is configured for inhibiting the lever to continue moving beyond the second end of the rail in a direction which extends away from both the first end and the second end of the rail; wherein the flange at least partially spans a width of the rail.

According to a second aspect of certain embodiments there is provided a device for changing the gear of a bicycle, the device comprising: a casing; and, a lever moveable relative to the casing for actuating a gear change of a bicycle; a rail arranged on the casing: wherein the rail extends between a first end and a second end, wherein the lever is configured to move along a length direction of the rail, which extends between the first end and the second end of the rail, for actuating the gear change of the bicycle, wherein the rail extends about a width direction, and wherein the rail projects from the casing about a height direction; wherein the casing comprises a flange located at the second end of the rail, wherein the flange is configured for inhibiting the lever to continue moving beyond the second end of the rail in a direction which extends away from both the first end and the second end of the rail; wherein the flange: at least partially spans, and projects beyond, a first side of the rail; at least partially spans, and projects beyond, a second side of the rail, wherein the second side is opposite the first side; and projects beyond each side of the rail by at least 2 mm.

According to a third aspect of certain embodiments there is provided a handlebar, for a bicycle, comprising the device according to the first or second aspect.

According to a fourth aspect of certain embodiments there is provided a bicycle comprising the device according to the first aspect or second aspect.

According to a fifth aspect of certain embodiments there is provided a method for controlling the movement of a lever, from a device for changing the gear of a bicycle, wherein the method comprises: moving the lever along a length direction of a rail from the device, wherein the length direction extends between a first end and a second end of the rail, and wherein the rail projects from a portion of the device about a height direction; and inhibiting the lever, to continue moving beyond the second end of the rail in a direction which extends away from both the first end and the second end of the rail, using a flange located at the second end of the rail, wherein the flange at least partially spans a width of the rail.

According to a sixth aspect of certain embodiments there is provided a method for controlling the movement of a lever, from a device for changing the gear of a bicycle, wherein the method comprises: moving the lever along a length direction of a rail from the device, wherein the length direction extends between a first end and a second end of the rail, and wherein the rail projects from a portion of the device about a height direction; inhibiting the lever, to continue moving beyond the second end of the rail in a direction which extends away from both the first end and the second end of the rail, using a flange located at the second end of the rail, wherein the flange: at least partially spans, and projects beyond, a first side of the rail; at least partially spans, and projects beyond, a second side of the rail, wherein the second side is opposite the first side; and projects beyond each side of the rail by at least 2 mm.

It will be appreciated that features and aspects of the disclosure described above in relation to the various aspects of the disclosure are equally applicable to, and may be combined with, embodiments of the disclosure according to other aspects of the disclosure as appropriate, and not just in the specific combinations described herein.

BRIEF DESCRIPTION OF THE DRAWINGS

Embodiments of the disclosure will now be described, by way of example only, with reference to the accompanying drawings, in which.

DETAILED DESCRIPTION OF THE DRAWINGS

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

The present disclosure relates to a device for changing the gear of a bicycle. Such devices may be referred to as components or the like. In the present disclosure, the term "device" may be used more frequently.

Figure 1:
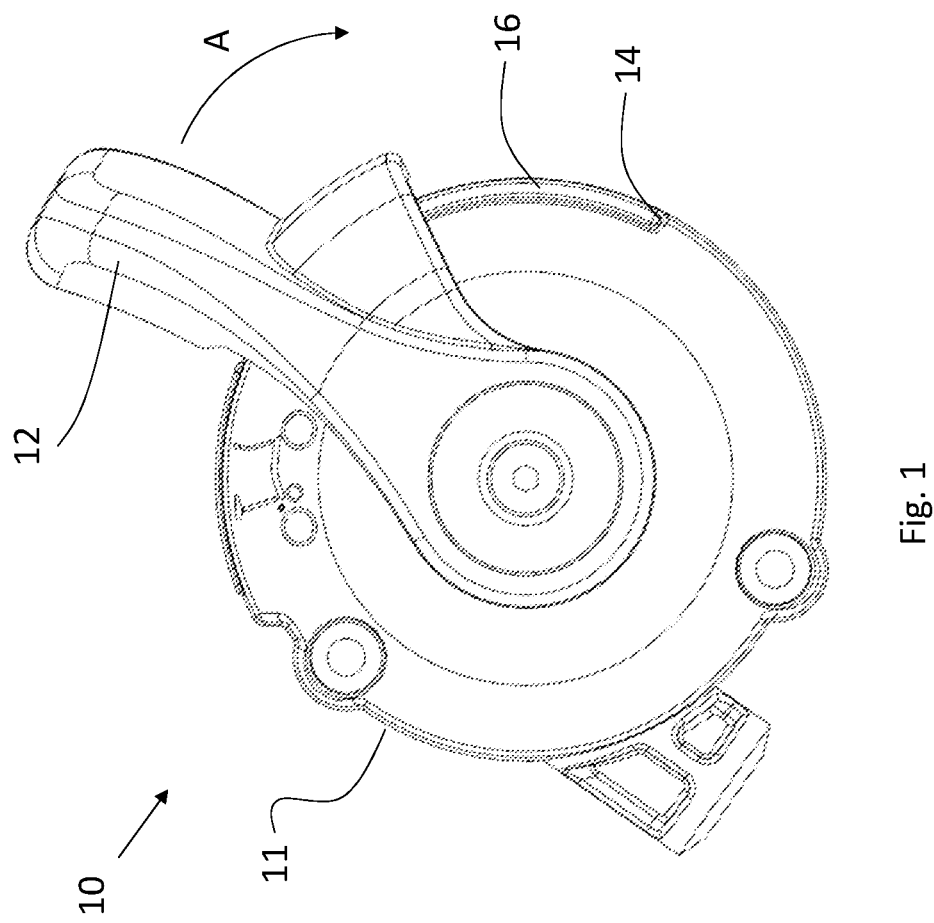
FIG. 1 shows a front-on view of a device for changing the gear of a bicycle.

FIG. 1 illustrates an example of a gear-changing device 10. The device 10 has a casing 11. The device 10 has a lever 12. The lever 12 is movable relative to the casing 11. The lever 12 may be actuated to cause a gear change. The device 10 has a rail 16 on which the lever 12 moves. The device 10 also has a flange 14 arranged to touch the lever 12 after the lever 12 has moved sufficiently to actuate a change of gear.

The lever 12 is moved in the direction of arrow A to change gear. The lever 12 is moved rotationally relative to the casing 11. As the lever 12 moves in the direction of arrow A, the lever 12 moves towards the flange 14. After moving sufficiently, the lever 12 will change gear. The lever 12 if kept moving in the direction of A will eventually touch flange 14.

FIG. 1 shows a gear-changing device 10 from a front-on view.

Figure 2:
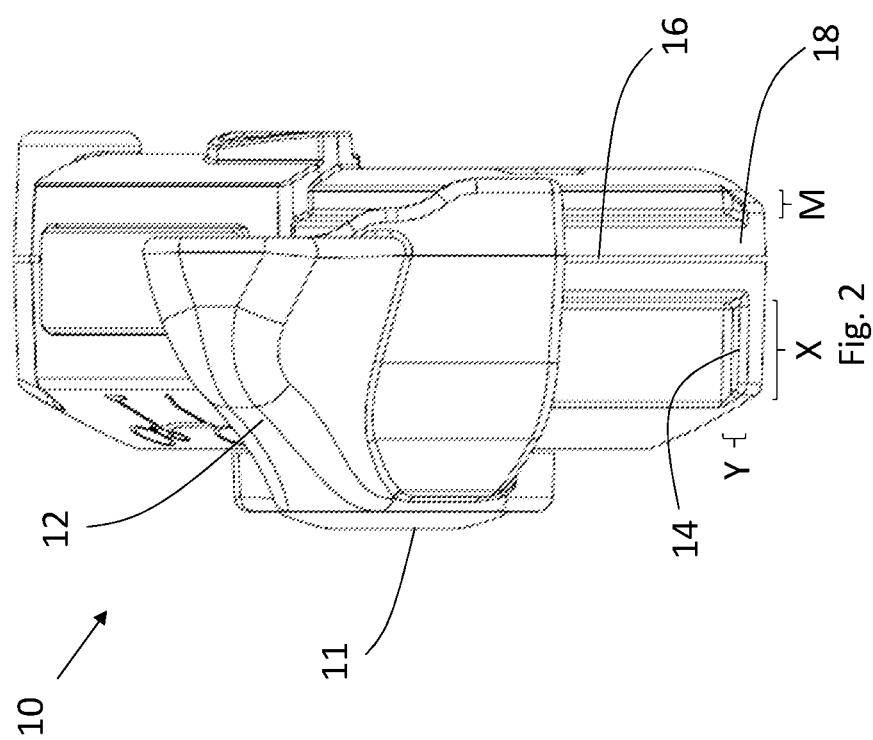
FIG. 2 shows an end-on view of a device for changing the gear of a bicycle.

FIG. 2 illustrates an example of a gear-changing device 10. FIG. 2 shows the gear-changing device 10 of FIG. 1 from an end on view. As discussed above for FIG. 1, the device 10 has a casing 11, a lever 12, and a flange 14. The device 10 has a rail 16 on which the lever 12 moves. The flange 14 is arranged to touch the lever 12 after the lever 12 has moved sufficiently to actuate a change of gear.

The flange 14 and rail 16 are shown in FIG. 2. The flange 14 has dimensions of X and Y on one side of the rail and M and Y on the other. These dimensions may be of the order of up to a millimeter. In an example, the dimension Y is around 1.0 mm, 1.1 mm, 1.2 mm, 1.3 mm or 1.4 mm. The flange 14 is arranged to align with an end of the rail 16 to touch the lever 12 after the lever 12 has been actuated to change a gear of a bicycle.

The lever 12 is moved in the direction of arrow A (not shown in FIG. 2) to change gear. The lever 12 is moved rotationally relative to the casing 11. As the lever 12 moves in the direction of arrow A, the lever 12 moves towards the flange 14. After moving sufficiently, the lever 12 will change gear. The lever 12 if kept moving in the direction of A will eventually touch flange 14.

Figure 3:
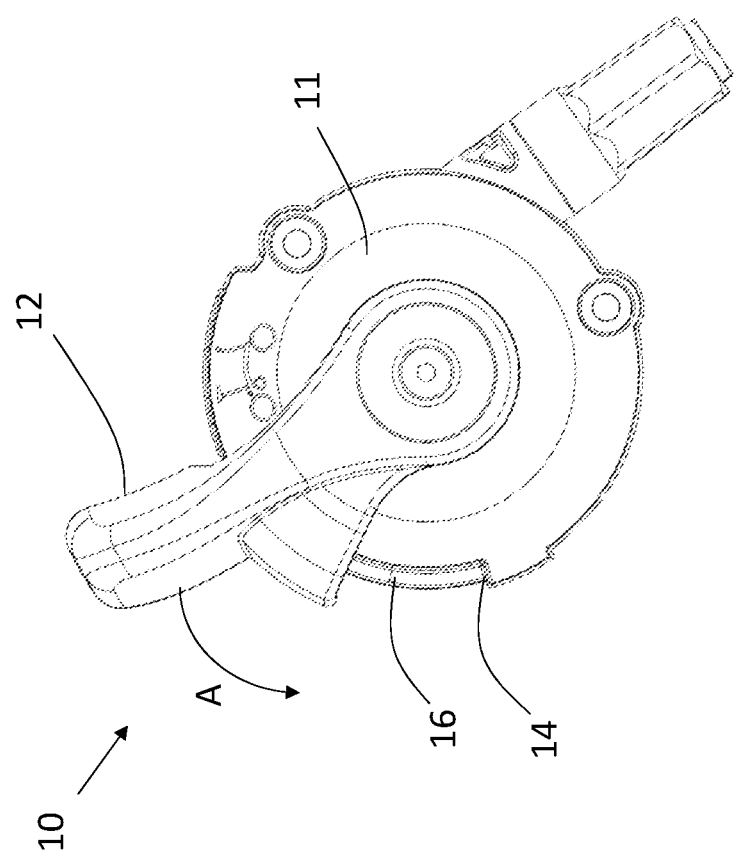
FIG. 3 shows a front-on view of a device for changing the gear of a bicycle according to an embodiment of the disclosure.

FIG. 3 shows a front-on view of a device 10 for changing the gear of a bicycle. The device 10 has a casing 11. The device 10 also has a lever 12 moveable relative to the casing 11 for actuating a gear change of a bicycle. The device 10 has a rail 16 arranged on the casing 11. The rail 16 extends between a first end and a second end. The lever 12 is configured to move along a length direction of the rail 16, which extends between the first end and the second end of the rail 16, for actuating the gear change of the bicycle. The rail 16 extends about a width direction and projects from the casing about a height direction. The casing 11 has a flange 14 located at the second end of the rail 16. The flange 14 is configured for inhibiting the lever 12 to continue moving beyond the second end of the rail 16 in a direction, which extends away from both the first end and the second end of the rail 16. The flange 14 at least partially spans a width of the rail 16.

As with the arrangement of FIG. 1, the lever 12 is moved in the direction indicated by arrow A to actuate a change of gear. The lever 12 is moved towards the flange 14 during this operation. The flange 14 inhibits the movement of the lever 12 in the direction of A once the lever 12 meets the flange 14. In this way, the flange 14 provides a backstop for the lever 12 during actuation. In such a way, the flange 14 provides an additional lever of safety during use of the device 10. The flange 14 also provides an element of control during the use of the device. This in turn, decreases the likelihood of incorrect use of the device 10 and therefore increases the lifetime of the device 10 by inhibiting potential user damage to the device 10 through careless usage.

Figure 4:
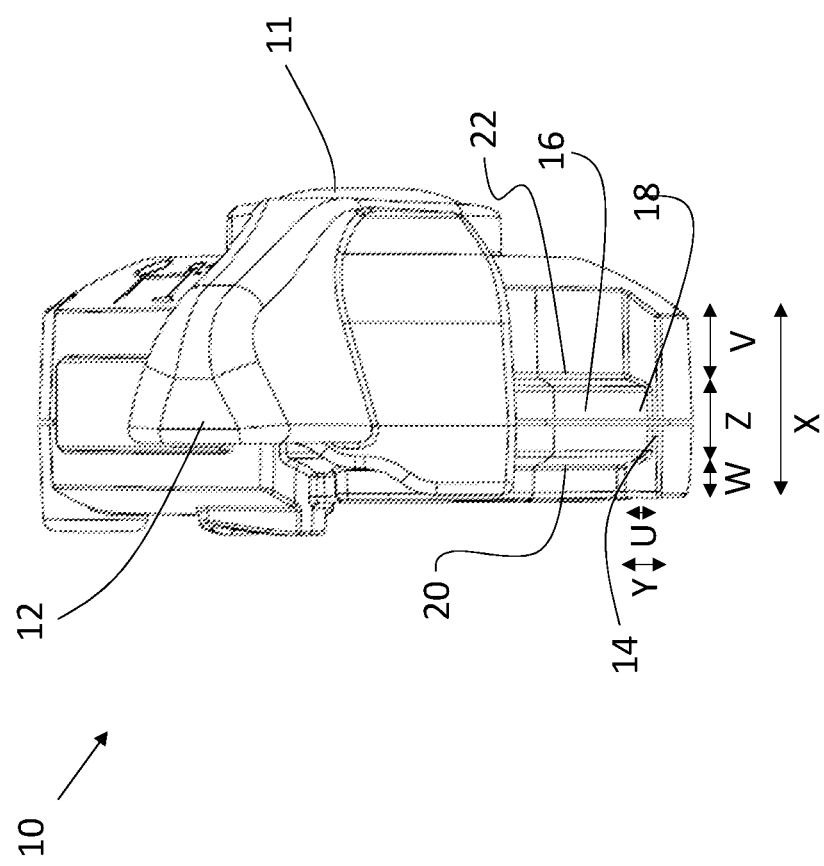
FIG. 4 shows an end-on view of a device for changing the gear of a bicycle according to an embodiment of the disclosure.

FIG. 4 illustrates an example of a gear-changing device 10. FIG. 4 shows the gear-changing device 10 of FIG. 3 from an end on view. As discussed above for FIG. 3, the device 10 has a casing 11, a lever 12, and a flange 14. The device 10 has a rail 16 on which the lever 12 moves. The flange 14 is arranged to inhibit the movement of the lever 12 in the direction indicated by arrow A (on FIG. 3). The flange 14 is arranged to inhibit the movement of the lever 12 after the lever 12 has moved sufficiently to actuate a change of gear.

The rail 16 has a first end (obscured by lever 12 in FIG. 4) and a second end 18. The second end 18 is located such that the gear change is actuated by movement of the lever 12 from the first end to the second end 18. The gear change may occur at or before the lever 12 meets the second end 18.

The flange 14 can be seen to span a width of the rail 16. The flange 14, in the example of FIG. 4, completely spans the width of the rail 16.

In the example of FIG. 4, the flange 14 has a width of X, while the rail 16, at the second end 18, has a width of Z. The width X of the flange 14 is greater than the width Z of the rail 16 at the second end 18. The width X of the flange 14 is greater than the width Z of the rail 16 along the length of the rail 16, though this need not be the case. The rail 16 may have a varying width along its length.

The flange 14 may partially span a height of the rail 16. The flange 14, in the example of FIG. 4, completely spans the height of the rail 16.

In the example of FIG. 4, the flange 14 has a height of Y, while the rail 16, at the second end 18, has a height of U. The height Y of the flange 14 is greater than the height U of the rail 16 at the second end 18. The height Y of the flange 14 is greater than the height U of the rail 16 along the length of the rail 16, though this need not be the case. The rail 16 may have a varying height along its length.

In the example shown, the flange 14 projects beyond the height U of the rail 16 as the height Y of the flange is greater than the height U of the rail 16.

In this way, the flange 14 provides a highly effective inhibiting action against the continued movement of the lever 12 past the second end 18 of the rail 16. In particular, the specific arrangement disclosed provides significant protection against a lever 12 moved carelessly by a user. During use, a user may use the lever 12 in a careless manner (moving the lever 12 too hard or with a twisting motion), the present arrangement provides a great level of protection against movement of the lever 12 beyond the second end 18 of the rail 16. In such a way, the flange 14 protects against damage of the device 10 and therefore improves the lifetime of the device 10.

In use, the lever 12 runs along the rail 16 to actuate change of a gear of a bicycle. The lever 12 reaches the flange 14 and is prevented from moving further in the original direction of movement (direction indicated by arrow A in FIGS. 1 and 3). The flange 14 provides a backstop function against the lever 12. The flange 14 need not be arranged at an end 18 of the rail 16, as shown, rather the flange 14 is to be arranged at or after the position in which the lever 12 is required to be to actuate a gear change (the gear change position).

If the flange 14 is located after the gear change position, preferably the flange 14 is located shortly after the gear change position. This reduces the amount of unnecessary movement past the gear change position of the lever 12.

The flange 14 of the present disclose provides an improved prevention of unintended movement of the lever 12 during use.

The flange 14 of the example of FIG. 4 at least partially spans, and projects beyond, a first side 20 of the rail 16. In the example shown, the flange 14 fully spans the width Z of the rail 16. In the example shown, the flange 14 projects beyond the width Z of the rail 16 by a distance W. The flange 14 projects beyond the width Z of the rail 16 by a distance W from a first side 20 of the rail 16.

The flange 14 of the example of FIG. 4 at least partially spans, and projects beyond, a second 22 side of the rail, wherein the second side 22 is opposite the first side 20. In the example shown, the flange 14 fully spans the width Z of the rail 16. In the example shown, the flange 14 projects beyond the width Z of the rail 16 by a distance V.

In the example shown, the distances W and V are not the same. This need not be the case. The flange 14 may project beyond the width Z of the rail 16 by at least 1 mm.

In accordance with some embodiments, the flange 14 may project beyond the width Z of the rail 16 by at least 1 mm; by at least 1.5 mm; by at least 2 mm; by at least 2.5 mm; by at least 3 mm; by at least 4 mm; and/or by at by at least 5 mm.

In an example, the flange 14 may project from the width Z of the rail 16 by at least 1 mm and no more than 10 mm. In an example, the flange 14 projects from each side 20, 22 of the rail 16 by at least 2 mm. In an example, the flange 14 projects from each side 20, 22 of the rail 16 by at least 10 mm and no more than 25 mm.

In accordance with some embodiments, the flange 14 may project beyond the width Z of the rail 16 by no more than 25 mm; no more than 22 mm; no more than 20 mm; no more than 18 mm; no more than 15 mm; no more than 12 mm; and/or no more than 10 mm.

The use of the dimensions mentioned above accounts for typical careless user usage. A user may twist or bend the lever 12 during use such that the lever 12 moves around the rail 16 by a distance. This distance is not likely to be beyond a few millimeters (depending on manufacturing constraints). The use of, for example, dimensions of around 2 mm accounts for a careless user moving the lever 12, in an unintended direction (e.g. in a width direction or a height direction) by 2 mm. Such a movement is rare and, as such, the dimensions above assist in overcoming the vast amount of careless use examples sometimes seen impacting previous devices.

The device 10 shown in FIG. 4, with the dimensions discussed above, also provides an improved distribution of load (forces during use) against the stress caused by a careless user. This in turn assists in preventing inadvertent sheer of a portion of the lever 12 as the load during use is better distributed across the great surface area of the flange 14. Again, this reduces the likelihood of damage and therefore improves the lifetime of the device 10.

The device 10 shown in FIG. 4 may be provided on a bar of a bicycle for ease of use by a user riding a bicycle. In an example, the device 10 may be provided on a handlebar. The device 10 may be provided as part of a bicycle.

In use, the user rotates the lever 12 in the direction indicated by arrow A (see FIG. 3). The lever 12 moves relatively to the casing 11. The lever 12 moves from a first position (the at rest position) to a second position. The second position may be the gear change position or after (preferably shortly after) the gear change position. In either example, the movement from the first position to the second position of the lever 12 actuates a gear change. The lever 12 is then prevented from further movement in the original direction of movement of the lever 12. The prevention of relative movement of the lever 12 may be via abutting of the lever 12 to the flange 14 when moving in the first direction past the second position.

The rotation of the lever 12 may be about the casing 11. The lever 12 may be configured to rotate about the casing 11 for actuating the gear change of a bicycle the actuation occurring at a certain degrees of rotation. In an example, the lever 12 may rotate through 20° to actuate the gear change. In other examples, the lever 12 may rotate through 25, 30, 35, 40 or 45°. In other examples, the lever 12 may rotate through 100, 110 or 120°. The flange 14 is configured to prevent the lever 12 from rotating about the casing 11 by an angle of more than 120°.

In an example, the lever 12 may rotate through 140°, 150°, 160°, 170°, or 180° to actuate the gear change. The flange 14 is configured to prevent the lever 12 from rotating about the casing 11 by an angle of more than 180°.

The lever 12 may rotate through a first direction to change gear in one direction (e.g. a change up in gear) and rotate through a second direction to change gear in a different direction (e.g. change down in gear). The device 10 may therefore have a first flange located at, or near, the end of the rail 16 in one direction and a second flange located at, or near, the end of the rail 16 in the other direction. In this way, the advantages associated with the flange can be provided to the movement of lever 12 in changing both up and down in gear. The lever 12 may be located as default towards a central portion of the rail 16. This may be referred to as a default or rest location of the lever 12. The lever 12 may move up to 45° in the first direction (from the default position) to change up gear. The lever 12 may move up to 25° in the second direction (from the default position) to change down gear. This would allow for a total movement of the lever 12 of around 70° or so. The total movement of the lever 12 may be up to around 80°, 90°, 100° or 110° or so.

Movement in the first direction may be movement in the direction A shown in FIGS. 1 and 3. Movement in the second direction may be movement in a direction opposite to direction A shown in FIGS. 1 and 3.

In an example the casing 11 may be formed of a portion. In an example, the casing may be formed from a first portion and a second portion.

The lever 12 may be arranged to at least partially cover the first casing portion and the second casing portion. Covering the two portions means that the lever 12 can be positioned at a join of the two casing portions. The lever 12 can be located more proximal to the two casing portions, to allow a better application of force towards the center of the two halves of the casing 11. As such, load balancing is improved. This arrangement also renders the lever 12 less prone to damage when compared to being located in a more exposed position (such as being positioned on the outside of one of the two casing portions). As such, this arrangement reduces possible damage to the lever 12 and therefore improves the lifetime of the device 10.

Appreciating the foregoing therefore, there has accordingly been described devices 10 whose travel for the lever 12 can thereby be better controlled. This being the case, there has therefore been appreciably described a device for changing the gear of a bicycle, the device comprising: a casing;

and, a lever moveable relative to the casing for actuating a gear change of a bicycle; a rail arranged on the casing: wherein the rail extends between a first end and a second end, wherein the lever is configured to move along a length direction of the rail, which extends between the first end and the second end of the rail, for actuating the gear change of the bicycle, wherein the rail extends about a width direction, and wherein the rail projects from the casing about a height direction; wherein the casing comprises a flange located at the second end of the rail, wherein the flange is configured for inhibiting the lever to continue moving beyond the second end of the rail in a direction which extends away from both the first end and the second end of the rail; wherein the flange at least partially spans a width of the rail.

There has also been described a device for changing the gear of a bicycle, the device comprising: a casing; and, a lever moveable relative to the casing for actuating a gear change of a bicycle; a rail arranged on the casing: wherein the rail extends between a first end and a second end, wherein the lever is configured to move along a length direction of the rail, which extends between the first end and the second end of the rail, for actuating the gear change of the bicycle, wherein the rail extends about a width direction, and wherein the rail projects from the casing about a height direction; wherein the casing comprises a flange located at the second end of the rail, wherein the flange is configured for inhibiting the lever to continue moving beyond the second end of the rail in a direction which extends away from both the first end and the second end of the rail; wherein the flange: at least partially spans, and projects beyond, a first side of the rail; at least partially spans, and projects beyond, a second side of the rail, wherein the second side is opposite the first side; and projects beyond each side of the rail by at least 2 mm.

There has also been described a method for controlling the movement of a lever, from a device for changing the gear of a bicycle, wherein the method comprises: moving the lever along a length direction of a rail from the device, wherein the length direction extends between a first end and a second end of the rail, and wherein the rail projects from a portion of the device about a height direction; and inhibiting the lever, to continue moving beyond the second end of the rail in a direction which extends away from both the first end and the second end of the rail, using a flange located at the second end of the rail, wherein the flange at least partially spans a width of the rail.

There has also been described a method for controlling the movement of a lever, from a device for changing the gear of a bicycle, wherein the method comprises: moving the lever along a length direction of a rail from the device, wherein the length direction extends between a first end and a second end of the rail, and wherein the rail projects from a portion of the device about a height direction; inhibiting the lever, to continue moving beyond the second end of the rail in a direction which extends away from both the first end and the second end of the rail, using a flange located at the second end of the rail, wherein the flange: at least partially spans, and projects beyond, a first side of the rail; at least partially spans, and projects beyond, a second side of the rail, wherein the second side is opposite the first side; and projects beyond each side of the rail by at least 2 mm.

There has also been described a device 10 for changing the gear of a bicycle. The device 10 comprises a casing 11; and, a lever 12 moveable relative to the casing 11 for actuating a gear change of a bicycle; a rail 16 arranged on the casing 11: wherein the rail 16 extends between a first end and a second end 18, wherein the lever 12 is configured to move along a length direction of the rail 16, which extends between the first end and the second end 18 of the rail 16, for actuating the gear change of the bicycle, wherein the rail 16 extends about a width direction, and wherein the rail 16 projects from the casing 11 about a height direction; wherein the casing 11 comprises a flange 14 located at the second end of the rail 16, wherein the flange 14 is configured for inhibiting the lever 12 to continue moving beyond the second end 18 of the rail 16 in a direction which extends away from both the first end and the second end 18 of the rail 16; wherein the flange 14 at least partially spans a width of the rail 16.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention (s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims provided herein. Various embodiments may suitably comprise, consist of, or consist essentially of, various combinations of the disclosed elements, components, features, parts, steps, means, etc. other than those specifically described herein. The disclosure may include other inventions not presently claimed, but which may be claimed in future.

In this respect for instance, although the herein described devices 10 have been described with reference to the rail projecting from the casing, it will also be appreciated that in accordance with some embodiments (for instance, in some more open-shaped embodiments of the device 10), the rail may be configured to project from any portion of the device 10—i.e. not necessarily a casing therefrom.

The invention claimed is:

1. A device for changing a gear of a bicycle, the device comprising:
    a casing;
    a lever moveable relative to the casing for actuating a gear change of a bicycle; and
    a rail arranged on the casing, wherein the rail extends between a first end and a second end,
    wherein:
        the lever is configured to move along a length direction of the rail, which extends between the first end and the second end of the rail, for actuating the gear change of the bicycle,
        the rail extends about a width direction and projects from the casing about a height direction,
        the casing comprises a flange located at the second end of the rail, wherein the flange is configured for inhibiting the lever to continue moving beyond the second end of the rail in a direction which extends away from both the first end and the second end of the rail,
    the flange at least partially spans a width of the rail, and
    wherein the flange projects beyond a width of the rail by at least 1 mm.

2. The device according to claim 1, wherein the flange completely spans a width of the rail.

3. The device according to claim 1 wherein the flange at least partially spans a height of the rail.

4. The device according to claim 1, wherein the flange completely spans the height of the rail.

5. The device according to claim 1, wherein the flange projects beyond a height of the rail.

6. The device according to claim 1, wherein the flange:
at least partially spans, and projects beyond, a first side of the rail; and
at least partially spans, and projects beyond, a second side of the rail, wherein the second side is opposite the first side.

7. The device according to claim 1, wherein the flange projects from the width of the rail by at least 1 mm and no more than 10 mm.

8. The device according to claim 1, wherein the flange projects from each side of the rail by at least 2 mm.

9. The device according to claim 1, wherein the casing comprises: a first casing portion; and
a second casing portion configured to releasably engage with the first casing portion, wherein the rail projects from the first casing portion and the second casing portion.

10. The device according to claim 9, wherein the first casing portion comprises a first casing half, and wherein the second casing portion comprises a second casing half.

11. The device according to claim 9, wherein the lever at least partially covers the first casing portion and the second casing portion.

12. A handlebar for a bicycle comprising the device of claim 1.

13. A bicycle comprising the device according to claim 1.

14. A device for changing a gear of a bicycle, the device comprising: a casing;
a lever moveable relative to the casing for actuating a gear change of a bicycle; and
a rail arranged on the casing, wherein the rail extends between a first end and a second end,
wherein the lever is configured to move along a length direction of the rail, which extends between the first end and the second end of the rail, for actuating the gear change of the bicycle,
wherein the rail extends about a width direction, and wherein the rail projects from the casing about a height direction,
wherein the casing comprises a flange located at the second end of the rail,
wherein the flange is configured for inhibiting the lever to continue moving beyond the second end of the rail in a direction which extends away from both the first end and the second end of the rail,
and wherein the flange:
at least partially spans, and projects beyond, a first side of the rail,
at least partially spans, and projects beyond, a second side of the rail,
wherein the second side is opposite the first side, and projects beyond each side of the rail by at least 2 mm.

15. The device according to claim 14, wherein the flange at least partially spans a width of the rail.

16. The device according to claim 14, wherein the lever is further configured to rotate about the casing for actuating the gear change of a bicycle.

17. The device according to claim 16, wherein the flange is configured to prevent the lever from rotating about the casing by an angle of more than 180 degrees.

18. The device according to claim 17, wherein the flange is configured to prevent the lever from rotating about the casing by an angle of more than 120 degrees.

19. The device according to claim 14, wherein the lever is configured to move, along the rail, between a first circumferential position about the casing and a second circumferential position about the casing.

20. The device according claim 14, wherein the device is configured to be attached to a handlebar portion of the bicycle.

* * * * *